United States Patent [19]
Morton et al.

[11] 3,762,948

[45] Oct. 2, 1973

[54] REJUVENATION OF DETERIORATED ANION EXCHANGE RESINS OCCLUDED WITH ORGANIC IMPURITIES

[75] Inventors: Donald E. Morton; Roger S. Leiser, both of Decatur, Ill.

[73] Assignee: A. E. Staley Manufacturing Company, Decatur, Ill.

[22] Filed: July 2, 1971

[21] Appl. No.: 159,546

[52] U.S. Cl. .................. 127/46 A, 210/30, 260/2.3
[51] Int. Cl. ..................... B01d 15/06, C13d 3/14
[58] Field of Search ............... 127/46 A; 210/30, 210/32; 260/2.3

[56] References Cited
UNITED STATES PATENTS 3,317,424  5/1967  Schmidt ............................. 210/30
2,451,272  10/1948  Blann ................................. 127/46 A

*Primary Examiner*—Morris O. Wolk
*Assistant Examiner*—Sidney Marantz
*Attorney*—M. Paul Hendrickson et al.

[57] ABSTRACT

Anionic exchange resins exhibiting a reduced syrup refining capacity are rejuvenated to a useful state by treating the anionic exchange resins at a temperature of at least 170° F. with a concentrated acid solution for a period of time and under conditions sufficient to remove therefrom the occluded organic impurities which interfere with its anionic exchange capacity.

20 Claims, No Drawings

REJUVENATION OF DETERIORATED ANION EXCHANGE RESINS OCCLUDED WITH ORGANIC IMPURITIES

BACKGROUND OF THE INVENTION

In the preparation of conversion syrups, a considerable amount of undesirable anionic conversion syrup impurities are either inherently produced or required in their manufacture. Acid and enzymatic hydrolysis of starches in either the thinning and saccharification thereof conventionally require acidic conditions. Likewise undesirable organic acid by-products are produced as a result of the hydrolysis and saccharification processing thereof. To meet consumer's demands, it is usually necessary to remove these undesirable impurities from the conversion syrup product.

In the refining of syrups (e.g., refining of corn conversion syrup products) it is conventional to employ cationic and anionic exchange resins to remove these impurities. Although such ion-exchange resins are initially effective in removing ionic and other undesirable impurities from the syrup, a significant decrease in ion exchange capacity is encountered with continued use thereof. After prolonged usage, the ion exchange resins become occluded with impurities which result in an inability to effectively purify and refine the conversion syrup. In order to maintain a satisfactory ion-exchange capacity, it is also conventional to frequently regenerate the cation exchange resins with a dilute acid solution (e.g., 2–10 percent sulfuric acid) and the anion exchange resins with dilute alkali (e.g., 2–5 percent aqueous sodium hydroxide). Although regeneration of anionic exchange resin with dilute alkali temporarily increases its anion exchange capacity, it does not fully recover the resin to its full potential capacity. With each successive alkali regeneration, the anion exchange resins exhibit a progressively lower anion exchange capacity. Thus, the anion-exchange resins, after prolonged commercial use, will reach a state wherein the anion exchange capacity of the resins cannot be economically restored to useful syrup refining capacity by conventional regeneration processes. When conventional alkali regeneration processes become generally ineffective in restoring the resins anion exchange capacity, the syrup manufacturer normally discards and replaces the resin with a new anionic exchange resin.

The costs incurred by corn syrup producers need to periodically replace deteriorated or spent anion exchange resins results in a significant increase in overall production costs. For most commercial corn syrup producers, the total anion exchange resin replacement costs will generally amount to several hundred thousand dollars or more annually. If it were possible to rejuvenate deteriorated anion exchange resins, significant cost reductions would be realized by the conversion syrup processer.

OBJECTS

An object of the present invention is to increase the operative life of anion exchange resins such as used in the refining of conversion syrup products.

Another object of the present invention is to substantially reduce anion exchange resin costs in conversion syrup refining processes.

A still further object of the invention is to provide an efficient and economical method for rejuvenating anionic exchange resins occluded with organic matter.

An additional object of the invention is to remove occluded, anionic impurities from anionic exchange resins and thereby increase their anion exchange capacity.

DESCRIPTION OF THE INVENTION

According to the present invention, there is provided a method for rejuvenating and prolonging the operative life of deteriorated anion exchange resins which are occluded with organic impurities resulting from the resins use in the refining of aqueous saccharide mediums such as starch hydrolyzates and fermentable syrup products, said method comprising treating an anion exchange resin occluded with organic impurities at a temperature of at least 170° F. with a concentrated solution of a non-oxidizing acid for a period of time sufficient to remove from the anion exchange resin the occluded organic impurities and thereby increase the anionic-exchange capacity of the resin.

The application of anionic exchange resins in neutralizing and/or absorbing undesirable impurities from aqueous saccharide mediums such as starch conversion syrups, low D. E. starch hydrolyzate products (e.g., maltodextrin and hydrolyzates which have a saccharide degree of polymerization of 4 or more), beet and cane syrups to provide a commercially acceptable product is well understood by the art. As commonly understood by the art, the anion exchange resins generally known as the weak base anion-exchange resins are most suitable for this purpose. In contradistinction to the strong base anion-exchange resins, the weak base resins are unable to remove weak acids such as $H_2SiO_3$ and $H_2CO_3$ or split neutral salts. However, similar to the strong base resin, the weak base resins are capable of neutralizing or absorbing strong acids.

Generally, the weak anion exchange resins contain as an acid absorbent either primary, secondary or tertiary amine groups reacted with an infusible and insoluble resin matrices. The composition of anion exchange resin matrices include thermoset resins such as: styrene as a major constituent copolymerized with divinylbenzene (normally produced and used in the spherical form), phenol-formaldehyde condensates (generally used in the granular form), epoxy-polyamine condensates, and other similar insoluble, infusible resin matrices. Illustrative weak base (acid absorbents) anion exchange resins which are commercially available include "Duolite" A-2, A-2M, A-4F, A-6, A-7 and A-57, manufactured by Diamond Shamrock Chemical Company; "Amberlite" IR A-93, IR-45, IRA-47 and IRA-68 and "Stratabed 93" manufactured by Rohm & Haas Company; "Ionic" A-315, A-330 and A-300 by Ionic Chemical Company, Division of Pfaudler-Permutit; "Permutit Deacidite" and Permutit A; Nalcite "WBR" and "Dowex 3" distributed by Nalco Chemical Company. The invention is particularly adapted to hydrophilic, macroporous, weak base anion exchange resins of a cross-linked phenol-formaldehyde matrix containing active cationic tertiary amine groups.

It has been unexpectedly discovered that deteriorated anionic exchange resins can be restored to useful refining capacity by treating resins which are occluded with organic impurities with concentrated acid solutions at elevated temperatures. Pursuant to the rejuvenation process of the present invention, the deteriorated anion exchange resins are treated with a concentrated non-oxidizing acid at temperatures of at least 170° F. for a period of time and under conditions wherein the anion exchange resin is rejuvenated to a useful anion exchange refining capacity. Non-oxidizing acids suitable for rejuvenating the resin include strong acids such as hydrochloric and sulfuric acid. Since the amine substituents and resin matrices are generally adversely effected under oxidative conditions, oxidizing acids such as phosphoric and nitric acids are generally unsuitable in rejuvenating the anion exchange resins herein.

The concentration of the acid solution used in rejuvenating deteriorated anion exchange resins to a useful refining capacity is an important aspect of the present invention. Dilute acid solutions incapable of removing the occluded organic matter are unsatisfactory. In general, the amount of acid required to effectively rejuvenate the resins exceeds the acid absorbent capacity of the deteriorated resin. For example, 100 volumes of a weak base anion exchange resin having an anion exchange capacity of about 1.50 equivalents per liter (i.e., eq./l.) of resin which is admixed and treated with 150 volumes of 6N sulfuric acid will initially reduce the acid normality to a value of about 3.5N without removing therefrom any of the occluded organic material. Further treatment of the resin under rejuvenation conditions (e.g., 7 hours at 195° F.) will further decrease the acid normality to about 3.0 and remove from the resin the occluded organic impurities. If such a deteriorated resin were treated with a more dilute acid solution (e.g., about 3N sulfuric acid), the acid would merely be absorbed by resin without any concomitant removal of the occluded organic impurities therefrom.

Pursuant to the present invention, the acid concentration is necessarily in excess of the absorbent capacity of the deteriorated resin and also sufficient to remove the occluded organic material from the deteriorated resin. As more fully described later, the acid concentration should be of a sufficient high concentration to remove the occluded organic material and increase the anion exchange capacity of resin. On a basis of a 100 volumes of deteriorated resin to 150 volumes of acid solution, the normality of the acid solution will generally be greater than about 4.0 normal with significantly improved processing efficiency and rejuvenation results being achieved at acid concentration greater than about 5N. Excessively high acid concentration which adversely effects the anion exchange refining capacity should be avoided (e.g., excessively high acid concentrations which attack the matrice or cation groups under the rejuvenation conditions employed). Illustrative acid concentrations suitable in the rejuvenation process range from about 5N to about 10N and preferably less than about 7N.

In addition to acid concentration, the temperature employed in the rejuvenation process is a significant factor. Concentrated acid solutions without the benefit of concomitant elevated temperatures sufficient to enable the acid medium to dissolve and remove the occluded impurities from the resin are not suitable in rejuvenating a deteriorated resin. At temperatures below 170° F. (e.g., 160° F. or less), little, if any, restoration in anion exchange capacity is obtained. Although the rejuvenation temperature bears an interrelationship with acid concentration (e.g., more concentrated requiring a lesser period of time and/or temperature), temperatures of at least 180° F. (particularly within the range of about 190° to about 210° F.) significantly improve the anion exchange resin capacity comparative to those deteriorated resins subjected to a lower temperature. Temperatures above the boiling point of concentrated acid solution may be used (e.g., under pressure). Due to increased processing costs, corrosion, health hazards, etc., it is advantageous to conduct the process at atmospheric pressure. Excessively high temperatures, as well as acid concentrations and period of treatment, which adversely effect the anion exchange capacity of the resin should obviously be avoided.

Another significant factor in rejuvenating deteriorated anion exchange resins, is the period of time the resin is rejuvenated. The rejuvenation time factor is interrelated to the temperature and acid concentrations. Thus, like the acid concentration and the temperature conditions, the period of treatment is necessarily sufficient to remove the occluded organic impurities and thereby enhance the anion exchange capacity of the resin. Appropriate time intervals for the rejuvenation treatment can be ascertained by comparing the initial refining capacity of the deteriorated resin with its anion exchange capacity after the rejuvenation treatment. Using a 6N hydrochloric or sulfuric acid aqueous solution, a 1–2 hour treatment at a temperature of about 205° ± 15° F., is generally ineffective while treatment thereof for about 5–10 hours will normally effectively rejuvenate the resin to a satisfactory anion exchange capacity. While continued treatment of the anionic resins for prolonged periods of time (e.g., 10–20 hours or more) does not generally adversely effect the anion exchange resins properties, such prolonged treatment does not impart any significant rejuvenation improvement over those resins which have been treated from about 5 to 10 hours.

The rejuvenation process of the present invention is generally applicable to those anionic exchange resins which become occluded with organic matter during the refining and purification of aqueous saccharide mediums containing undesirable impurities conventionally removed therefrom by anion exchange resins. Typical aqueous saccharide mediums refined and purified with anionic exchange resins include starch hydrolyzate products as well as other related fermentable sugar products. Starch hydrolyzate products are normally prepared by acid or enzymatic hydrolysis of aqueous medium wherein the starch has gelatinized and solubilized. The dextrose equivalent (i.e., D.E.) of such hydrolyzate products may vary from about 10 D.E. (e.g., maltodextrins) to the more completely hydrolyzed products of a D.E. up to about 100 (e.g., dextrose conversion syrup prepared by glucoamylase preparations). Illustrative glucose and corn syrups (conversion syrups) derived from starch are those having 20–38 D.E. (a low D.E. conversion syrup), a 38–58 D.E. (medium D.E. conversion syrup), a 58–73 D.E. (a high D.E. syrup) and very high D.E. conversion syrup of a 73 D.E. or more. In general, as the D.E. increases, the amount of unfermentable sugars (e.g., saccharide of a D.P. of 4 or more) decreases. The manner whereby such conversion syrups are prepared is known to the art as exemplified by the teachings of U.S. Pat. No. 2,891,869. The rejuvenation process is also applicable to those resins occluded with organic impurities resulting from the refining of high fermentable extract value such as the high dextrose syrups (e.g., dextrose dry solids content of 90 percent or even above 95 percent such as exemplified by U.S. Pat. No. 3,303,102, or the purification of total sugar products) and a high maltose syrup (e.g., 50–80 percent maltose solids), syrups having both a high maltose and dextrose content and the like. As evidenced by the aforementioned, the rejuvenation process is well suited for removing occluded impurities from resins which have previously been used in the refining of syrups containing as a principal constituent the fermentable sugars and particularly those which contain fermentable sugars as a major solid ingredient. In general, fermentable sugars are deemed to include those saccharides of a D.P. of 3 or less such as dextrose, fructose, maltose, maltotriose, lactose, sucrose (e.g., cane and beet sugar) maltose syrups, mixtures thereof and the like.

Exemplary patents which teach the utilization of an anion exchange resin in the refinement of aqueous saccharide mediums are U.S. Pat. Nos. 2,388,194; 2,388,195; 2,388,222–2,388,224; 2,413,844; 2,481,768; 2,503,767; 2,510,980; 2,534,560; 2,560,504; 2,564,820; 2,568,925; 2,594,440; 2,688,572; 2,926,110; 2,490,716; 2,606,847; 2,680,082 and 2,871,147, Canadian Patent No. 488,178 (1952), British Patent No. 716,934 (1954) and Swiss Patent No. 302,892 (1955).

The invention is particularly applicable to the rejuvenation of anion exchange resins which have been previously used to remove organic impurities from starch hydrolyzate products (e.g., the corn conversion syrup products). Such hydrolyzate products may suitably be prepared by the acid and/or enzymatic hydrolysis of starch bearing substances including from acid or enzymatically thinned hydrolyzates and conversion syrups prepared by the enzymatic or acid hydrolysis thereof. These conversion syrups typically contain varying proportions of either maltose and/or dextrose and varying amounts of saccharides of a higher degree of polymerization.

As indicated herein, the anion exchange capacity is a suitable means of ascertaining the effectiveness of the rejuvenation process. The anionic exchange capacity of an anion resin correlates to its effectiveness in removing organic impurities from aqueous saccharide mediums. On a comparative basis, a particular type of an anion exchange resin having a higher anion exchange capacity than an identical type of resin with a lower capacity is capable of removing a higher amount of impurities. This enables the higher capacity resin to operate at a higher throughput rate to provide a comparable syrup quality as one of a lesser capacity operating at a lower throughput rate. Accordingly, those resins of a higher capacity can process a greater quantum of material to provide an acceptable product than those of a lesser capacity rating. By comparing the anion exchange capacities prior and after rejuvenation, the effectiveness of the rejuvenation process can be determined.

Unexpectedly it has been found that the anion exchange resins of a low refining capacity resulting from their continued use, can be rejuvenated to such an extent that the resultant rejuvenated anion exchange resins have an operative refining capacity life similar to new or freshly prepared anion exchange resins. Similar to fresh anion exchange resins, the rejuvenated resins can be regenerated periodically with dilute alkali (generally only effective in removing ash components). Upon depletion of their refining capacity, the rejuvenated anion exchange resin can then be subsequently rejuvenated and used in the commercial refining of conversion syrup products. The rejuvenation process of the present invention is capable of increasing the anion exchange capacity of the deteriorated anion exchange resin occluded with organic impurities by a factor of at least 0.1 equivalents per liter of resin with typical rejuvenated resin depicting a total capacity increase greater than about 0.2 eq./l. (e.g., about 0.2 to about 0.4 eq./l. or more).

The rejuvenation process is most suitably conducted on those resins which still possess a major portion of their initial and original anion exchange capacity (i.e., the anion exchange capacity of the resin as originally obtained from the manufacturer). Although resins which have been deteriorated to less than 50 percent of their original capacity can be rejuvenated to an acceptable level, significantly improved rejuvenation capacities and total operative life of the anion exchange are accomplished when the resins are rejuvenated when they possess at least about 60 percent to about 90 percent of their initial anion exchange capacity. The most effective stage for rejuvenating resins is when the anion exchange has been reduced to between about 65 percent to about 80 percent of their original capacity. The operative life of the resin (e.g., by more frequent rejuvenation thereof) is also extended by periodic rejuvenation of those resins which have not been allowed to excessively deteriorate.

The means of determining the weak base anion exchange capacity of the deteriorated, new and rejuvenated anion exchange resins herein via the capacity of the resins to remove strong mineral acid from aqueous solution by an adsorption procedure is generally known to the art as exemplified by pages 63–65 in a publication entitled "Duolite Ion-Exchange Manual" published by the Resinous Products Division, Diamond Shamrock Chemical Company, copyright 1969, Library of Congress Catalog Card No. 60-15806. The methodology for determining anionic exchange capacities herein was as follows:

I. Total Anionic Capacity Test Procedure 1. 65 ml. of the anion-exchange resin (a bed volume) was placed in a one inch diameter column fitted with a nylon screen at the bottom.

2. The resin was backwashed at one bed volume per minute with 0.5 liter distilled water to orient the particles.

3. The resin was regenerated with 360 ml. of 1N NaOH at a flow rate of 8 bed volumes per hour.

4. The excess alkali was rinsed from the resin with distilled water at 16 bed volumes per hour to a pH of 9.5.

5. An influent was prepared by diluting 125 ml. of 2N HCl to 1,800 ml. with distilled water.

6. The resin was then exhausted with acid effluent at a flow rate of 16 bed volumes per hour with the acid influent being collected therefrom.

7. The resin was rinsed with approximately 300 ml. of ethanol and force residual liquid from the cell with air pressure with the resultant effluent being collected.

8. The entire effluent was then titrated with 3N NaOH to methyl red endpoint.

9. The resin was then regenerated with 360 ml. of 1N NaOH at a flow rate of approximately 8 bed volumes per hour.

10. Excess alkali was rinsed from the resin with distilled water at 16 bed volumes per hour to a conductivity of 600 microohms.

11. The resin was then quantitatively transferred to a 100 ml. graduate and gently tamp until a constant volume (i.e., $V_c$) is obtained.

II. Calculation of Anion Exchange Capacity ($iTc$) in equivalents per liter of resin (i.e., eq./l.)

$$Tc = (0.125 \times N\ HCl) - (1.\ NaOH \times N\ NaOH)/Vc$$

wherein the N HCl is the normality of acid used in step 5, 1 NaOH × N NaOH represents the liters of NaOH time its normality (step 8) and $Vc$ is the constant volume in liters of step 11.

The anionic resins to which the present invention is applicable includes those resins occluded with impurities and which are capable of withstanding the severe acid and thermal treatment necessary to rejuvenate the resins to a commercially acceptable anion exchange capacity. Anion exchange resins wherein either the resinous matrice or anionic substituents are physically and/or chemically altered to a refining capacity of lesser magnitude (e.g., the acid and thermal treatment adversely effects its anionic exchange character in the refining of conversion syrups) are not adapted to the rejuvenation process of the present invention.

The rejuvenation process may be conducted in conventional apparatus adapted to provide uniform distribution and contact of the resin with the hot acid solutions. Uniform heat transfer during the rejuvenation process can be accomplished by means of agitation, heat exchangers, maintaining the resin and hot acid solution under turbulent conditions (e.g., a continuous pipe reactor), continually pumping the hot acid through a zone containing the resin, etc. The removal of occluded impurities from the deteriorated resins is further facilitated by subjecting the resin to turbulent conditions (e.g., agitation) during the rejuvenation processing thereof.

The following examples are merely illustrative and should not be construed as limiting the scope of the invention.

EXAMPLE 1

A. Previous history of a deteriorated anion exchange resin occluded with organic impurities A granular, weak base anionic exchange resin comprised of a phenol-formaldehyde condensate matrices with tertiary amine cationic substituents (manufactured and distributed by Diamond Shamrock Chemical Company of Redwood City, California as "Duolite A-6") was employed in an ion exchange resin refining system to remove organic impurities from a 28 Baume conversion syrup which was prepared by acid thinning a corn starch paste to a Dextrose Equivalent (referred to herein as D.E.) of about 20–30 and then saccharified with a glucoamylase preparation to 64 D.E. intermediate conversion syrup product. The resins in this refining system were operatively connected in series with the conversion syrup being respectively conducted to the primary cation exchange resin bed, primary anion exchange resin bed, secondary cation exchange resin bed and then through the secondary anion exchange resin bed. The anion exchange resin was initially placed in the secondary bed position, then the primary bed position and regenerated with a 6.7 percent by weight disodium carbonate aqueous solution (i.e., alkali regeneration) which respectively jointly constitute a cycle (e.g., about 1 day per cycle). Prior to its use, the anion exchange resin had an initial anion exchange capacity of 1.95 equivalent per liter of resin (referred to herein as eq./l.) and after 152 cycles, the resin had deteriorated by fouling with organic impurities to such an extent it was economically unfeasible to use the resin. The effluent syrups from the deteriorated anion exchange resin bed were characterized as containing high degree of colored bodies as opposed to clear effluents initially obtained from the resin. Analysis of the deteriorated anion exchange resin indicated its anionic exchange capacity had decreased to a value of 1.48 eq./l. (i.e., about 76 percent its original capacity).

B. Rejuvenation of the deteriorated anion exchange resin

To a 500 gallon, glass lined reactor equipped with an agitator and temperature recorder-controller, there was added 120 parts by volume water and 33 parts by volume 60° Baume sulfuric acid (i.e., a six normal or 25 percent sulfuric acid solution) with agitation. To the reactor, 100 parts by volume of the deteriorated resin was added to the acid solution and the resultant mixture was heated to 200° F. The temperature of the mixture was maintained at 200° F. for 7 hours with continuous agitation. The mixture was then cooled to 90° F. The acid treated resin was then partitioned from the acid solution along with the dissolved organic impurities which had been dissolved and removed from the resin by the rejuvenation processing thereof. The treated resin was then washed free of the sulfuric acid solution with water.

C. Results of the rejuvenation process

The resultant acid solution containing the removed organic impurities was subjected to a chemical oxygen demand (i.e., C.O.D.) test and found to have a net increase in C.O.D. of 6,500 mg./l. The anionic exchange capacity of resin was increased to a value of 1.75 eq./l. (i.e., its capacity was increased by 0.27 eq./l. by the rejuvenation process). The granular particle size of the resin was not altered by the rejuvenation process.

In order to ascertain the effectiveness of the rejuvenation process, the rejuvenated resin was reused in the refining and purification of intermediate conversion syrup as mentioned above in 1A. After 195 cycles, the anion exchange resin had again deteriorated to a state warranting its removal from the anion refining bed. The deteriorated resin was then rejuvenated a second time in accordance with the methodology of the above subparagraph B of this example. It was observed that the second rejuvenation thereof increased its anion exchange capacity from 0.91 eq./l. to 1.04 eq./l. Since the primary purpose of this example was to determine the additional life expectancy of an anion exchange resin once rejuvenated upon, the resin had been allowed to deteriorate to an exchange capacity of 0.91 eq./l. Although the anion exchange capacity did not have as high of a capacity as it possessed after the initial rejuvenation of subparagraph B above, the resin was still deemed as having a sufficient capacity to warrant its reuse in refining conversion syrup products. Pursuant to a preferred rejuvenation procedure, the anion exchange resin would be removed from the ion exchange system and again rejuvenated prior to its deterioration to an anion exchange capacity of less than 1.20 eq./l. By not permitting the anion exchange resin to deteriorate below about 1.20 eq./l., the effectiveness of anion exchange capacity and operative life (e.g., by subsequent rejuvenation thereof) are best achieved. Based upon previous experience, it was observed from this example that rejuvenation had increased the operative life of the resin by about a two-fold factor.

The chemical oxygen demand test was determined as follows:

Reagents

1. Standard Potassium Dichromate Solution, 0.125N; Dissolve exactly 6.129 grams $K_2Cr_2O_7$, previously dried for 2 hours at 105° C., in distilled water and dilute to one liter volume with distilled water.

2. Standard Ferrous Ammonium Sulfate Solution, 0.067N; Dissolve 26.3 grams $FeSO_4(NH_4)_2 \cdot 6H_2O$ and 20 ml. of conc. sulfuric acid in distilled water, cool and dilute to one liter with distilled water. This solution must be standardized against the dichromate solution daily.

Standardization Procedure: Dilute 10 ml. of the standard dichromate solution to about 250 ml. with distilled water. Add 15 ml. of conc. sulfuric acid and cool. Add 2-3 drops of ferroin indicator. Titrate with ferrous ammonium sulfate to the end point which is a reddish blue color.

Normality = (Ml. $K_2Cr_2O_7$ × 0.125)/(Ml. Titration)

3. Ferroin Indicator: Dissolve 1.485 g. 1, 10-phenanthroline and 0.695 g. $FeSO_4 \cdot 7H_2O$ in distilled water and dilute to 100 ml.

4. Concentrated Sulfuric Acid, C.P. grade.

Procedure

1. Place 5 ml. of the well mixed sample (It may be necessary to use more or less sample than 5 ml. This is determined by the color of the mixture while refluxing. If the solution losses its orange chromate color, the sample is too strong.) in an iodine flask using a pipette.

2. Add 10 ml. of 0.125 N potassium dichromate solution.

3. Add 15 ml. conc. sulfuric acid. Shake mixture in rotating manner.

4. Attach flask to condenser and boil for 15 minutes.

5. Disconnect flask and cool to 40°–50° C.

6. Add 2–4 drops of ferroin indicator and titrate with ferrous ammonium sulfate to the end point. The color change at the end point is sharp, changing from a blue-green to a reddish blue.

Calculation

1. C.O.D. (ppm) = [(A − B) × normality of ferrous ammonium sulfate × 8,000]/Ml. of sample where A = Ml. of ferrous ammonium sulfate used in standardization procedure where B = Ml. of ferrous ammonium sulfate used for sample titration.

EXAMPLE 2

This example illustrates the effect of the type of conversion syrup to which the resins were exposed. These resins were deteriorated and treated in a manner similar to Example 1 and the results are tabulated in the following Table I. Initially the new anion exchange resin had an anion exchange capacity of 1.95 eq./l.

In this example, the rejuvenation process was conducted with a resin to 6N sulfuric acid volume ratio of 2:3 for 300 minutes at 195° F. The intermediate conversion syrup products, tabulated under the heading initial use, were comparable to that mentioned in Example 1A. The high dextrose conversion syrup to which resins 5 and 6 were subjected to prior to rejuvenation had a D.E. of about 95–97, 28 Baume and dextrose solids content ranging from about 95–97 percent by weight. Resin Nos. 1, 3 and 7 were previously used in refining a 28 Baume maltose syrup having a D. E. ranging from about 45–55, 30–60 percent by weight maltose content, about 5–20 percent by weight dextrose solids with the remaining portion being primarily saccharide of a D.P. 3–10.

TABLE I

| Resin No. | Resin Initial Use | | Total Capacity eq./l. | |
|---|---|---|---|---|
| | No. Cycles | Conversion Syrup | Prior To Rejuvenation | After Rejuvenation |
| 1 | 157 | Maltose | 1.27 | 1.53 |
| 2 | 164 | Intermediate | 1.12 | 1.34 |
| 3 | 264 | Maltose | 0.90 | 1.13 |
| 4 | 202 | Intermediate | 1.50 | 1.73 |
| 5 | 246 | High Dextrose | 1.08 | 1.30 |
| 6 | 190 | High Dextrose | 1.25 | 1.47 |
| 7 | 191 | Maltose | 1.16 | 1.35 |
| 8 | 208 | Intermediate | 1.40 | 1.61 |

From the aforementioned data of Table 1, it may be observed that the rejuvenation increased the anion exchange capacity significantly. For the "Duolite A-6" resins, it has been experienced those resins having anion exchange capacity of less than 1.20 eg./l are not particularly suitable for use in refining conversion syrups (e.g., throughput rates for good syrup quality are too low and progressively decrease below a satisfactory level). The resins are advantageously rejuvenated so that the resultant rejuvenated resin has a capacity significantly above 1.20 eq./l. The aforementioned resins after rejuvenation were reinstalled and used in the further refinement of conversion syrups. Resin Nos. 1, 2, 3 and a portion of 4 were still operating at satisfactory anion exchange capacity respectively after 176, 52, 110 and 80 cycles. Resin Nos. 4 and 5 were used jointly at about a 1:1 ratio and satisfactorily removing impurities after 85 cycles.

EXAMPLE 3

This example illustrates the effects of bases, type of acids, acid concentrations, time and temperature upon the rejuvenation of deteriorated "Duolite A-6" resin occluded with intermediate conversion syrups impurities. The resin was deteriorated in a manner similar to Example 1 and was rejuvenated in a 3 liter, 3 neck flask equipped with an agitator, thermometer and condenser. The results are tabulated in the following Table II. Initially, the new anion exchange resin had an anion exchange capacity of 1.95 eq./l.

TABLE II

| Resin number | Resin initial use | | Rejuvenation condition | | | Total capacity, eq./l. | |
|---|---|---|---|---|---|---|---|
| | Number cycles | Conversion syrup | Reagent | Temp., °F. | Time (min.) | Prior to rejuvenation | After rejuvenation |
| 9 | 190 | Intermediate | 6N—HCl | 175 | 240 | 1.13 | 1.40 |
| 10 | 190 | do | 6N—HNO$_3$ | 175 | 240 | 1.13 | 0 |
| 11 | 190 | do | 3N—HNO$_3$ | 175 | 240 | 1.13 | 0.15 |
| 12 | 190 | do | Na$_2$SO$_3$ | 203 | 960 | 1.13 | 1.09 |
| 13 | 190 | do | 6N—H$_2$SO$_4$ | 175 | 240 | 1.13 | 1.40 |
| 14 | 190 | do | 6N—HCl | 225 | 420 | 1.17 | 1.46 |
| 15 | 190 | do | 6N—HCl | 225 | 420 | 1.23 | 1.57 |
| 16 | 181 | High dextrose | 6N—H$_2$SO$_4$ | 195 | 60 | 1.34 | 1.48 |
| 17 | 181 | do | 2.4N—H$_2$SO$_4$ | 195 | 420 | 1.34 | 1.49 |
| 18 | 181 | do | 6N—H$_2$SO$_4$ | 195 | 1680 | 1.34 | 1.59 |
| 19 | 181 | do | 6N—H$_2$SO$_4$ | 120 | 420 | 1.34 | 1.39 |
| 20 | 181 | do | 9.6N—H$_2$SO$_4$ | 195 | 420 | 1.34 | 1.56 |
| 21 | 181 | do | 6N—H$_2$SO$_4$ | 195 | 420 | 1.34 | 1.56 |

In Resin Nos. 10 and 11, it was observed that nitric acid, as a rejuvenating reagent, chemically attacked the resin matrix (rejuvenated product was extremely friable).

As indicated hereinbefore, the anion exchange capacity can be used to determine the effectiveness of an anion exchange resin's ability to remove undesirable impurities from aqueous saccharide mediums. Frequently, an anion exchange resin of a low capacity will still possess a satisfactory utility in removing undesirable color bodies from a syrup (for example, see resin nos. 2, 3 and 4 in Table I, Example 2). Thus, a conversion syrup processer knowing the maximum permissible color for any particular conversion syrup product can readily determine the suitability of a particular resin by means of the anion exchange effluents' stream. Accordingly, another suitable test for ultimately determining the effectiveness of the rejuvenation process is to compare the amount of color impurities in an anion exchange resin effluent stream prior to and after rejuvenation of a deteriorated resin (for example, by means of conventional photo color metric analysis).

Since many embodiments of this invention may be made and since many changes may be made in the embodiments described, the foregoing is to be interpreted as illustrative only and the invention is defined by the claims appended hereafter.

What is claimed is:

1. A method for rejuvenating and prolonging the operative life of a deteriorated anion exchange resin which is occluded with organic impurities resulting from use in the refining of aqueous saccharide mediums such as starch hydrolyzates and other related fermentable syrup products, said method comprising treating the deteriorated anion exchange resin with a concentrated acid solution at a temperature of at least 170° F. for a period of time sufficient to remove from the anion exchange resin occluded organic impurities and to increase the anion exchange capacity of the resin.

2. The method according to claim 1 wherein the treated resin has an anion exchange capacity of at least 50 percent of its original anion exchange capacity.

3. The method according to claim 1 wherein the anion exchange resin is a weak base anion exchange resin.

4. The method according to claim 1 wherein the anion exchange resin is a weak base anion exchange resin of a cross-linked phenol-formaldehyde matrix containing cationic tertiary amine groups.

5. The method according to claim 4 wherein the acid is a strong mineral acid having a normality of at least 4 and the temperature during the treatment is at least 180° F.

6. The method according to claim 1 wherein the weak base anion exchange resin occluded with conversion syrup organic impurities is treated under conditions sufficient to increase the anion exchange resin capacity of the deteriorated resin by at least 0.1 eq./l. of resin.

7. The method according to claim 6 wherein the anion exchange resin is a weak base resin of a crosslinked phenol-formaldehyde matrix containing cationic tertiary amine groups.

8. The method according to claim 1 wherein the treated resin is reused as an anion exchange resin in the refining of aqueous saccharide mediums.

9. The method according to claim 8 wherein the resin is occluded with organic impurities consisting essentially of impurities resulting from the refining of corn starch conversion syrups having on a solids weight basis at least one major ingredient selected from the group consisting of dextrose, maltose and mixtures thereof.

10. The method according to claim 9 wherein the temperature is at least 180° F., the acid is a strong acid aqueous solution having a normality of at least 4 and the anion exchange resin is a weak base anion exchange resin of a crosslinked phenol-formaldehyde matrix containing cationic tertiary amine groups.

11. The method according to claim 1 wherein the occluded organic impurities result from the refining of aqueous mediums which contain a fermentable saccharide as a principal constituent on a dry solids weight basis and the acid is a strong acid.

12. The method according to claim 11 wherein the occluded impurities consist essentially of impurities resulting from the refining of a syrup containing sucrose as a major saccharide constituent.

13. The method according to claim 11 wherein the occluded organic impurities result from refining of starch hydrolyzates having a D.E. ranging from about 10 to about 100.

14. The method according to claim 13 wherein the starch hydrolyzate is a hydrolyzate of a corn starch which contains fermentable sugars as a major dry solids constituent on a weight basis and the strong acid is at least one member selected from the group consisting of hydrochloric acid and sulfuric acid.

15. The method according to claim 14 wherein the temperature ranges from about 190° F. to about 210° F. and the normality of the acid solution ranges from about 5 to about 10.

16. The method according to claim 13 wherein the anion exchange resin is primarily occluded with impurities of a corn starch hydrolysis origin and the anion exchange resin is a weak base anion exchange resin of a crosslinked phenol-formaldehyde matrix containing cationic tertiary amino groups.

17. The method according to claim 16 wherein the treatment increases the anion exchange resin capacity of the deteriorated resin by a value of at least 0.2 to about 0.4 eq./l. of resin.

18. The method according to claim 17 wherein the occluded impurities are due to the refining of a conversion syrup containing at least 90 percent by weight dextrose solids.

19. The method according to claim 17 wherein the conversion syrup has a minimum D.E. of 38.

20. The method according to claim 17 wherein the treated resin is subsequently employed to refine a corn syrup conversion product.

* * * * *

UNITED STATES PATENT OFFICE
CERTIFICATE OF CORRECTION

Patent No. 3,762,948  Dated October 2, 1973

Inventor(s) Donald E. Morton et al.

It is certified that error appears in the above-identified patent and that said Letters Patent are hereby corrected as shown below:

Column 1, lines 34 and 35, "recover" should read -- restore --; line 49, "results" should read -- result --. Column 3, lines 36-38, "the acid concentration should be of a sufficient high concentration to remove the occluded organic material and increase the anion" should read -- the acid should be sufficiently high in concentration so as to remove the occluded organic material and to increase the anion --; lines 46-47, "concentration which adversely effect" should read -- concentrat-tions whibh adversely affect --; Column 4, lines 7-8, "and period of treatment, which adversely effect" should read -- and a period of treatment which adversely affect --; line 29, "effect" should read -- affect --. Column 5, lines 58-59, "manner whereby such conversion syrups are prepared is" should read -- manner of preparing such conversion syrups is --; Column 4, line 64, "of high" should read -- of syrups having a high --; Column 4, line 68 - column 5, line 1, "and a high

UNITED STATES PATENT OFFICE
CERTIFICATE OF CORRECTION

Patent No. 3,762,948  Dated October 2, 1973

Inventor(s) Donald E. Morton et al.    Page - 2

It is certified that error appears in the above-identified patent and that said Letters Patent are hereby corrected as shown below:

maltose syrup (e.g., 50-80 percent maltose solids), syrups" should read -- , the high maltose syrups (e.g., 50—80% maltose solids) and syrups --. Column 5, line 30, "including from acid" should read -- including acid --; line 37, "means of ascertaining" should read -- means for ascertaining --. Column 6, line 6, "resin" should read -- resins --; line 67, "microohms" should read -- micro-mhos --. Column 7, line 21, "effects" should read -- affects --. Column 8, lines 50-51, "resin once rejuvenated upon," should read -- resin after being rejuvenated once, --; lines 48-49, "This example illustrates the effect of the type of conversion syrup to which the resins were exposed. These" should read -- This example illustrates the effect of various conversion syrups upon resins. These --. Column 10, line 21, "eg./1." should read -- eq./1. --; line 43, "removing" should read -- removed --; (last column of table)

UNITED STATES PATENT OFFICE
CERTIFICATE OF CORRECTION

Patent No. 3,762,948     Dated October 2, 1973

Inventor(s)     Donald E. Morton et al.     Page - 3

It is certified that error appears in the above-identified patent and that said Letters Patent are hereby corrected as shown below:

"Resin No. 14---1.46                --      Resin No. 14---1.47
 Resin No. 15---1.57  should read --        Resin No. 15---1.58
 Resin No. 16---1.48"                       Resin No. 16---1.46 --.

Column 11, line 22, "photo color metric" should read -- photocolormetric --.

Signed and sealed this 24th day of September 1974.

(SEAL)
Attest:

McCOY M. GIBSON JR.
Attesting Officer

C. MARSHALL DANN
Commissioner of Patents